Nov. 12, 1935.   F. M. STARR   2,020,972
PROTECTIVE ARRANGEMENT FOR ELECTRIC SYSTEMS

Filed Oct. 19, 1933

Inventor:
Frank M. Starr,
by Harry E. Dunham
His Attorney.

Patented Nov. 12, 1935

2,020,972

UNITED STATES PATENT OFFICE 2,020,972

PROTECTIVE ARRANGEMENT FOR ELECTRIC SYSTEMS

Frank M. Starr, Schenectady, N. Y., assignor to General Electric Company, a corporation of New York Application October 19, 1933, Serial No. 694,274

8 Claims. (Cl. 175—294)

My invention relates to improvements in protective arrangements for electric systems and more particularly to arrangements for ground fault protection of an electric system which includes two circuits interconnected through a power transformer having distributed windings. An object of my invention is to provide an improved ground fault protective arrangement which is relatively economical, operates selectively and requires a minimum of relatively simple protective devices.

In so-called primary voltage networks relatively high voltage feeders are connected to a distribution network through step-down transformers and circuit breakers. The transformers usually comprise primary windings connected in star to the feeder, secondary windings connected in star to the network and a closed delta winding. To obtain sufficiently sensitive protection for ground faults on a feeder so as to open the associated circuit breaker and thereby prevent the flow of energy from the network to the faulty feeder, power directional relays have been used. These, however, are relatively expensive and complicated, particularly as they require potential transformers. In accordance with my invention, where it is possible or desirable to have the secondary windings of the power transformer distributed and connected in star to the network, I provide a protective arrangement of a selective character which necessitates the use of only the simplest kind of relay devices and does not require potential transformers. While my invention is particularly adapted to systems of this type, its use is not so limited since it may be applied in general to any two circuits which are interconnected by a transformer having windings connected in star to one of the circuits, distributed windings connected in star to the other and a closed delta winding.

My invention will be better understood from the following description when considered in connection with the accompanying drawing and its scope will be pointed out in the appended claims.

Figure 1:
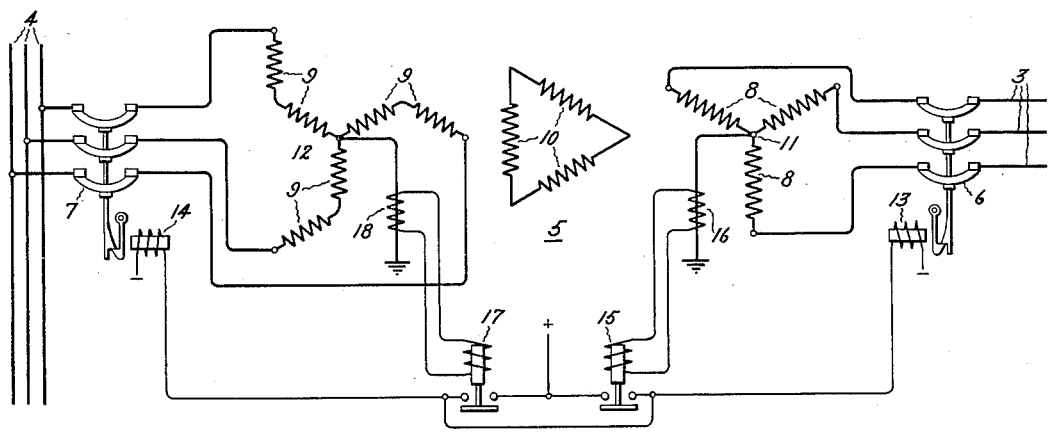
Figure 2:
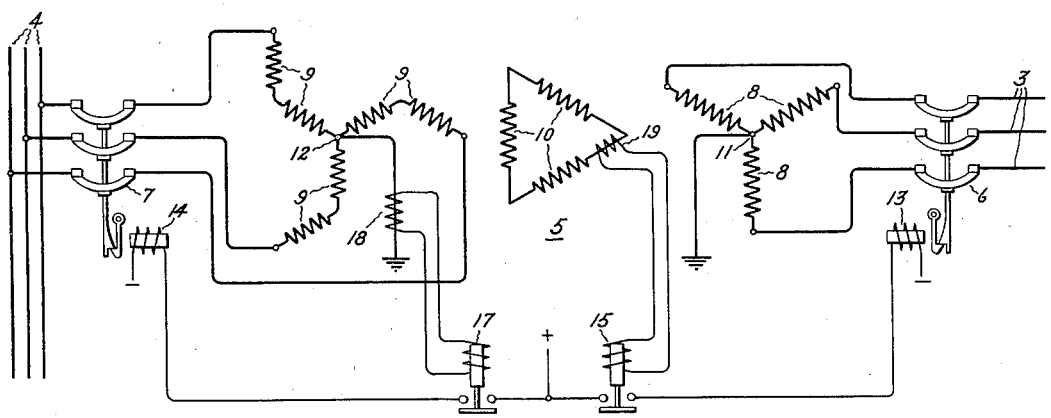

In the accompanying drawing, Fig. 1 illustrates diagrammatically one embodiment of my invention and Fig. 2 illustrates diagrammatically a modification of my invention.

In the illustrated embodiment of my invention shown in Fig. 1, a three-phase circuit 3 is connected to another three-phase circuit 4 through a transforming means 5 and one or more suitable circuit interrupting devices 6 and 7. The transforming means 5 is shown as comprising windings 8 connected in star to the circuit 3, distributed or zig-zag windings 9 connected in star to the circuit 4 and delta connected windings 10. The neutrals 11 and 12 of the windings 8 and 9 are connected to ground. The circuit interrupting means 6 and 7 may be latched closed circuit breakers provided with trip coils 13 and 14 respectively, as shown. The circuit 3 may be a relatively high voltage feeder which supplies the circuit 4, the latter being in a specific application of my invention a load circuit to which a lower voltage distribution network fed from other sources may be connected. In such cases the circuit interrupting means 6 is not always necessary. However, so far as the broad aspects of my invention are concerned, it is immaterial what the circuits 3 and 4 are specifically since the invention is generally applicable wherever there may be a transfer of power from either circuit to the other through a transformer of the general form illustrated.

Where the circuit 4 is, for example, a distribution network on which ground faults may be allowed to burn off and it is not desirable that the feeder circuit 3 be disconnected for such ground faults, and yet the feeder 3 must be disconnected in case of ground faults occurring thereon in order to prevent reverse energy flow into the feeder from the network, I provide, in accordance with my invention, suitable means such as a relay 15 which is responsive only to ground faults on the feeder 3. This relay 15 which may be of the simplest form of current relay may be connected to be energized in accordance with the current in the ground connection of the transformer neutral 11 through suitable means indicated as a current transformer 16. As shown, the relay 15 is arranged to control the circuit of the trip coil 14 and the circuit breaker 7. If desirable, as may sometimes be the case, the relay 15 may also be arranged to control the circuit of the trip coil 13 of the circuit breaker 6, as shown. Thus, whenever a ground fault occurs on the transformer windings 8 or the feeder 3 relay 15 will respond but for ground faults on the distributed windings 9 or any of the circuit connected thereto no ground fault current will appear in the earth connection of the transformer neutral 11 because of the arrangement of the windings 9. Consequently, the relay 15 will not respond.

If it is desired in any event to trip the circuit breaker 7 in response to ground faults on the circuit 4 or any part of the network connected thereto, I may provide in accordance with my invention suitable means such as a relay 17 which is connected to be energized in accordance with the current in the ground connection of the transformer neutral 12 through suitable means, such as a current transformer 18. As shown in Fig. 1, this relay 17 may be arranged to effect the tripping of both of the circuit breakers 6 and 7 in response to a ground fault on the circuit 4 or any part of the system connected thereto. Inasmuch as a ground fault on the feeder 3 will not produce ground fault current in the connection to ground of the transformer neutral 12 because of the arrangement of the windings 9, the relay 17 will not respond to ground faults on the feeder. Thus, between the relays 15 and 17 there is a selective control action dependent upon on which of the circuits 3 or 4 ground faults may happen to occur.

In the modification of my invention shown in Fig. 2, the relay 15 is connected to be energized in accordance with the current which circulates in the delta connected transformer windings 10, through suitable means such as a current transformer 19. Since current circulates in these windings only on the occurrence of a ground fault on the feeder 3 or the transformer windings 8, the relay 15 will respond only to such ground faults. In the modification of my invention shown in Fig. 2, the relays 15 and 17 are so connected to control the trip coils 13 and 14 respectively as selectively to trip the circuit breakers 6 or 7 in accordance with the location of a ground fault on the feeder 3 or the circuit 4.

While I have shown and described my invention in considerable detail, I do not desire to be limited to the exact arrangements shown but seek to cover by the appended claims all those modifications that fall within the true spirit and scope of my invention.

What I claim as new and desire to secure by Letters Patent of the United States is:—

1. An electric system including two three-phase circuits, a transformer including windings connected in star to each of said circuits, the windings connected to one of said circuits being distributed windings, circuit interrupting means between one of said circuits and the windings connected thereto, a connection from the neutral of one of said star connected windings to ground, and means for effecting the opening of said circuit interrupting means only on the occurrence of a ground fault on one of the circuits including a relay connected to be energized only in accordance with the current in said ground connection.

2. An electric system including two three-phase circuits, a transformer including windings connected in star to each of said circuits, the windings connected to one of said circuits being distributed windings, circuit interrupting means between each of said circuits and the transformer windings connected thereto, a connection from the neutral of each of said star connected windings to ground and relay means connected to be energized in accordance with the currents in said grounded connections for selectively effecting the opening of the circuit interrupting means associated with a circuit subjected to a ground fault.

3. An electric system including a three-phase feeder circuit, and a three-phase load circuit, a transformer having windings connected in star to said feeder circuit with the neutral grounded, windings connected in delta and distributed windings connected in star to said load circuit with the neutral grounded, a circuit breaker between said distributed windings and said load circuit and means connected to be energized only on the occurrence of a ground fault on the feeder circuit for effecting the opening of said circuit breaker.

4. An electric system including a three-phase feeder circuit, a three-phase load circuit, a transformer having windings connected in star to said feeder circuit, windings connected in delta and distributed windings connected in star to the load circuit, a circuit breaker between each of said circuits and the transformer windings connected thereto, a connection from the neutral of each of said star connected windings to ground and relay means connected to be energized in accordance with the currents of said neutral to ground connections for selectively effecting the opening of the circuit breaker associated with a circuit subjected to a ground fault.

5. An electric system including two three-phase circuits, a transformer having windings connected in star to one of said circuits with the neutral grounded, windings connected in delta and distributed windings connected in star to the other of said circuits with the neutral grounded, circuit interrupting means between each of said circuits and the transformer windings connected thereto and means connected to be energized only in accordance with the zero phase sequence currents of said circuits for selectively effecting the opening of the circuit interrupting means associated with a circuit subjected to a ground fault.

6. An electric system including two three-phase circuits, a transformer having windings connected in star to one of said circuits with the neutral grounded, windings connected in delta and distributed windings connected in star to the other of said circuits with the neutral grounded, circuit interrupting means between said distributed windings and said other circuit and means connected to be energized only on the occurrence of a ground fault on said one circuit for effecting the opening of said circuit interrupting means.

7. An electric system including two polyphase circuits, a transformer including windings connected in star to each of said circuits, the windings connected to one of said circuits being distributed windings, a connection from the neutral of each of said star connected windings to ground, and means operative only when a ground fault occurs on a predetermined one of said circuits including a relay connected to be energized only in accordance with the current in the neutral to ground connection of the windings connected to the circuit subjected to the ground fault.

8. An electric system including two polyphase circuits, a transformer including windings connected in star to each of said circuits, the windings connected to one of said circuits being distributed windings, a connection from the neutral of each of said star connected windings to ground, and means selectively operable only in dependence on which of said circuits a ground fault occurs including relays respectively connected to be energized only in accordance with the currents in said neutral to ground connections.

FRANK M. STARR.